United States Patent Office 3,261,810
Patented July 19, 1966

3,261,810
PROCESS FOR PREPARING POLYCARBONATES
Toshio Chiba, Ashigarakami-gun, Kanagawa-ken, Masao Izuka, Odawara-shi, Kanagawa-ken, and Nobuo Tsuji, Ashigarakami-gun, Kanagawa-ken, Japan, assignors to Fuji Photo Film Co., Ltd., Kanagawa-ken, Japan, a corporation of Japan
No Drawing. Filed June 24, 1963, Ser. No. 290,224
Claims priority, application Japan, July 7, 1962, 37/27,822
4 Claims. (Cl. 260—47)

This invention relates to a process for preparing aromatic polycarbonates having excellent physical, chemical and electrical properties, and particularly to a process for preparing polycarbonates consisting of a linear chain polymer of the following general formula:

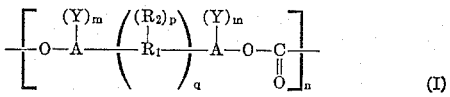

(I)

where
$R_1$ is an alkylidene group,
$R_2$ is an alkyl group,
A is a residual group of an aromatic nucleus,
Y is an inorganic atom, an inorganic group, an alkyl group or an alkoxy group, each of $m$ and $p$ is 0 or an integer larger than 0,
$q$ is 0 or 1 and,
$n$ is an integer.

Such resin is the most excellent thermoplastic so far as we know at present because of its good impact strength and excellent dimensional stability at elevated temperature and in moisture and also because of its desirable electrical properties.

Therefore, such resin is very useful for molding products such as insulators, packing material etc. In addition to the properties mentioned above, this resin shows a high degree of transparency, enough to give a quite excellent photographic film base.

This polymer can be prepared by means of transesterification or through the phosgene process. In case of the phosgene process, polycarbonates are synthesized by reaction of bis-(monohydroxyaryl)-alkane (II) of the following formula:

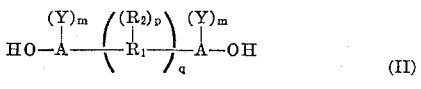

(II)

with either of phosgene and bis-chlorocarbonate of bis-(monohydroxyaryl)-alkane in such a chlorinated hydrocarbon as methylene chloride, chloroform, 1,2-dichloroethane, the organic layer being in contact with aqueous sodium hydroxide in order to take off hydrochloric acid formed in the course of the reaction.

In this case, however, the reaction proceeds only very slowly to give a product, if any, of relatively low molecular weight.

In the course of studies on the various new methods of the above reaction, we found that the time for the reaction can be considerably reduced and at the same time homogeneous polymer of high degree of polymerization can be easily obtained in the presence of a certain kind of water insoluble or sparingly soluble secondary or tertiary amide or a mixture of such.

Thus, our present invention consists in a process for preparing polycarbonates through condensation of bis (monohydroxyl)-alkane with phosgene or with bis-chloro carbonate of bis(monohydroxyaryl)-alkane by means of a catalyst of the general formula:

R'—NHCO—R—CONH—R'

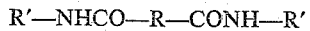
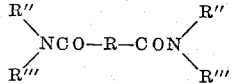

where R is an alkylene, an alkylidene, or a polymethylene group having 2–20 carbon atoms, R' is a cycloalkyl group having 3–20 carbon atoms, a alkyl group having cycloalkyl branch or a alkyl or a aralkyl group bearing at least one tertiary or quaternary carbon atom in the alkyl or aralkyl part and each of R" and R''' can either be a straight chain alkyl group having 1–20 carbon atoms, a cycloalkyl group having 3–20 carbon atoms, a alkyl group having cycloalkyl branch or alkyl or a aralkyl group bearing at least one tertiary or quaternary carbon atom in the alkyl or aralkyl part.

Even a small amount of a tertiary amine or its salt, as is described in Japanese patent application publication No. 5,592—1959, makes the rate of the reaction too large to permit good control over the reaction and thus to produce a polymer of a high molecular weight.

Particularly in a small scale preparation, polymerization is complete within 1 minute and, even in large scale preparation, it is complete within 10 minutes. Even with the aid of a chain terminating agent, the molecular weight of the products of these two reactions are considerably different from each other, and thus the control of the process is difficult.

Moreover, because of such a high rate of reaction, it also proceeds heterogeneously to be accompanied by a partial gelatination phenomenon and, as the result, a part of the product is sometimes insoluble or hardly soluble in solvent.

It is a well-known fact that such a phenomenon leads to the production of so-called "fish eyes" which give heterogeneous spots in the film, during the film making process. Furthermore, because of the rapid and heterogeneous reaction, the range of the molecular weight distribution becomes very wide and undesirable, and for this reason the physical properties of the polymer are lowered and the reproducibility is impossible.

According to the process of the present invention, it is possible to synthesize reproducibly polymers having excellent properties desirable for polycarbonates, since the reaction is not so rapid and violent as in case of the process in which the tertiary amines are used.

Moreover, according to the present invention, both the rate of the reaction and the molecular weights of the products are quite satisfactory in comparison with the use of no catalyst or the use of a quaternary ammonium compound. The secondary acid amides in the formula of which R' is a straight chain alkyl group, though soluble in solvents having comparatively high polarity, are rather insoluble in solvents as are ordinarily used to prepare the polycarbonates, such as chlorinated hydrocarbons, aromatic hydrocarbons, dioxane etc.

In order to increase the solubility in the ideal solution represented by the following equation:

$$\ln S = -\frac{H_f}{R}\left(\frac{1}{T}-\frac{1}{T_f}\right)$$

where S is solubility in molar fraction, R is gas constant, $H_f$ is heat of fusion, T is the temperature of solution (° K.) and $T_f$ is the melting point (° K.), the heat of fusion ($H_f$) should be reduced. For this purpose, it is necessary to introduce branching into the molecule, in order to make the configuration irregular and to separate the molecules from one another. In the present invention, therefore, secondary or tertiary acid amides carrying as many branches or bulky groups as possible are used. These acid amides should be soluble in the organic solvents used for the synthesis and insoluble or hardly soluble in the aqueous alkaline solution.

The secondary or tertiary acid amides which are used in the present invention are easily prepared by admixing primary or secondary amines with dicarboxylic acids or their esters in the molar ratio of 2:1, followed by dehydrating or dealcoholating by heating in the same way as in the general preparation of acid amides. They can be used as catalysts with or without purification (distillation or recrystallization) and may be used solely or in combination.

Examples of primary amines carrying the branched chain are isopropyl amine, sec-butylamine, tert-amylamine, 2-ethyl-hexyl amine, 2-methyl-2-ethyl-hexyl amine, 2-methyl, 2-ethyl-heptyl amine, 2,2-diethyl-octyl amine, 2 - methyl - 2 - butyl - octyl amine, 2 - ethyl - 2 - butyl-n-decyl amine, cyclohexyl amine, 2-methyl-2-($\beta$-cyclohexyl-ethyl)-dodecyl amine, 3-methyl-3-(cyclohexyl-ethyl)-nonyl amine, 2-phenacyl-2-methyl-dodecyl amine, 2-phenacyl-2-methyl-octyl amine, etc.

As examples of dicarboxylic acids, succinic acid, glutaric acid, adipic acid, suberic acid, pimeric acid, azelaic acid, sebacic acid, cyclohexane 1,4-dicarboxylic acid, etc., are used.

According to the present invention, the secondary or tertiary acid amides may be used alone or in combination.

Moreover it was found that they show a remarkable effect by addition of surface active agents. The amount of catalyst used in the present invention is not critical, but is preferably 0.5–30 weight percent based on the charged bis-(monohydroxyaryl)-alkanes.

According to the present invention, an alkaline solution of a bis-(mono-hydroxyaryl)-alkane or of a mixture of such is dispersed in a solvent such as benzene, toluene, methylene chloride, 1,2-dichloethane, which are able to dissolve polycarbonates. Into this mixture, equimolar or excess phosgene is introduced under stirring and maintained at 20–30° C. and then the secondary or tertiary acid amid catalysts are added singly or in combination. After 15–90 minutes the reaction mixture gradually grows viscous and finally it becomes a highly viscous mass.

Then, the upper layer of aqueous alkaline solution is removed and the mass is washed with water. After washing, the solution of the high molecular weight material thus obtained is re-precipitated with aid of an organic solvent such as alcohol, ester, ketone (e.g. methanol, ethanol, ethyl acetate, acetone, etc.) that does not dissolve polycarbonates, and is separated as a flake-like precipitate from the organic solvent. After drying, the polycarbonates can be used for various processes. Alternatively, after the above washing the product may be dried and the solution of the high molecular weight material which is obtained may be directly applied on metals or other supporting materials in order to form films or sheets.

In the above polycondensation reaction, it is much more convenient to control the reaction than to control the reaction using tertiary amine or its salts, because the reaction itself proceeds mildly and smoothly by using these acid amides.

Moreover, it is easy to control the molecular weight of the polymer to be obtained and the reaction is a reproducible one.

The intrinsic viscosity of the polycarbonate obtained in the present invention which is defined as follows $$\lim_{c \to} \eta sp/c = [\eta]$$

is 0.2–2.0 at 25° C.

Where $\eta sp$ is the specific viscosity of a polymer in methylene chloride, c is weight in gram of polymer in 100 ml. of the solvent.

For example, the properties of polymer from 2,2-bis-(4-hydroxyphenyl)-propane and phosgene, which is obtained in the hereafter mentioned Example 1 are as follows:

Tensile strength_____ 8.5 kg./mm.²
Elongation_____ 200%.
Yield point_____ 7.5 kg./mm.²
Melting point_____ 240–260° C.
Heat distortion temperature_____ 130–140° C.
Heat shrinkage_____ 0.13% (140° C.).
Absorption of moisture
  (after 24 hours immersion)_____ 0.24%.
Transparency_____ 94%.

Since the polycarbonates obtained by the present invention have excellent impact strength, dimensional stability, high degree of polymerization and sufficient transparency, they are not only useful for ordinary purposes such as packaging, etc., but also suitable as photographic film base. In addition, they have also excellent electrical properties and therefore are useful for insulating material and are suitable for various desirable purposes after molded solely or with various fillers.

This invention is further illustrated by the following examples, in which all "parts" represent parts by weight.

*Example 1*

114 parts of sufficiently purified 2,2-bis-(4-hydroxyphenyl)-propane are dissolved in 635 parts of an aqueous solution containing 60 parts of caustic soda and then the whole is dispersed into 240 parts of methylene chloride. To this dispersed mixture 55 parts of phosgene are introduced at 20–30° C. for 2.0 hours with stirring. After the introduction of phosgene, 300 parts of methylene chloride are added and kept with stirring for 30 minutes.

Then, at the same temperature 10 parts of the secondary acid amide from 2-ethylhexylamine and sebacic acid

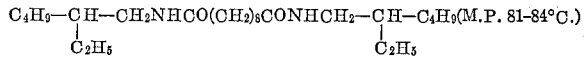
$C_4H_9$—CH—$CH_2NHCO(CH_2)_8CONHCH_2$—CH—$C_4H_9$ (M.P. 81–84°C.)
       |                                              |
       $C_2H_5$                                       $C_2H_5$ are added and after 20 minutes the reaction mixture becomes gradually viscous and finally forms a highly viscous mass after 40 minutes. Thereafter the upper layer of the aqueous alkaline solution is removed. After adding hydrochloric acid to the reaction mixture, the reaction is stopped.

The polycarbonate, which is obtained after washing with water and evaporating off the solvent, shows the above properties and its intrinsic viscosity determined by the above method is 1.32. The product shows excellent mechanical, chemical, optical and electrical properties.

*Example 2*

Commercial 2,2-bis-(4-hydroxyphenyl)-propane and the phosgene are reacted in the same manner as in Example 1. Instead of the secondary acid amide which is used in Example 1, 15 parts of the secondary acid amide from 2-ethyl-hexylamine and adipic acid.

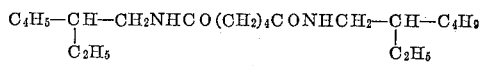
$C_4H_9$—CH—$CH_2NHCO(CH_2)_4CONHCH_2$—CH—$C_4H_9$
       |                                    |
       $C_2H_5$                             $C_2H_5$ are added with stirring and the reaction is continued as in Example 1.

The produced polycarbonate has the same excellent properties as product of Example 1 and has an intrinsic viscosity of 0.88 at 25° C.

*Example 3*

A reaction is undertaken under the same condition as in Example 1 except that 10 parts of the tertiary acid amide from diisopropylamine and adipic acid is used instead of the acid amide used in Example 1.

The polycarbonate shows the same excellent properties as the products of the preceding examples and has an intrinsic viscosity of 0.90 at 25° C.

What we claim is:
1. A process for preparing polycarbonates which comprise condensation-reacting a bis-(monohydroxyaryl)-alkane with a compound selected from the group consisting of phosgene and a bis-chloro-carbonic acid ester of a bis-(monohydroxyaryl)-alkane in the presence of an acid acceptor consisting of caustic alkali and in the presence of a catalyst selected from the group consisting of

$$R'—NHCO—R—CONH—R'$$

and

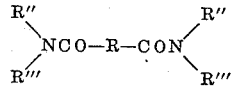

where R is a member selected from the group consisting of alkylene and alkylidene, said groups each having 2–20 carbon atoms; R' is a member selected from the group consisting of cycloalkyl having 3–20 carbon atoms, alkyl having cycloalkyl branches, and alkyl and aralkyl groups bearing at least one tertiary or quaternary carbon atoms; and R" and R''', each is a member selected from the group consisting of staright chain alkyl having 1–20 carbon atoms, and groups represented by R'.

2. A process according to claim 1 wherein the catalyst is the secondary acid amide of 2-ethylhexylamine and sebacic acid.

3. The process according to claim 1 wherein the catalyst is the secondary acid amide of 2-ethylhexylamine and adipic acid.

4. A process according to claim 1 wherein the catalyst is the tertiary acid amide of diisopropylamine and adipic acid.

References Cited by the Examiner

UNITED STATES PATENTS 2,964,797 12/1960 Peilstocker et al. _____ 260—47
3,148,985 9/1964 Ossenbrunner et al. ___ 260—47

SAMUEL H. BLECH, *Primary Examiner.*